(12) United States Patent
Cheng et al.

(10) Patent No.: US 12,512,643 B2
(45) Date of Patent: Dec. 30, 2025

(54) TUNABLE MICROWAVE SOURCE BASED ON DUAL-WAVELENGTH LASING OF SINGLE OPTICAL WHISPERING GALLERY MICROCAVITY

(71) Applicant: East China Normal University, Shanghai (CN)

(72) Inventors: Ya Cheng, Shanghai (CN); Renhong Gao, Shanghai (CN); Jianglin Guan, Shanghai (CN); Botao Fu, Shanghai (CN); Chuntao Li, Shanghai (CN); Min Wang, Shanghai (CN); Minghui Li, Shanghai (CN)

(73) Assignee: East China Normal University, Shanghai (CN)

( * ) Notice: Subject to any disclaimer, the term of this patent is extended or adjusted under 35 U.S.C. 154(b) by 591 days.

(21) Appl. No.: 18/107,524

(22) Filed: Feb. 9, 2023

(65) Prior Publication Data

US 2023/0187894 A1  Jun. 15, 2023

(30) Foreign Application Priority Data

Aug. 18, 2022 (CN) .......................... 202210991189.X

(51) Int. Cl.
*H01S 3/094* (2006.01)
*H01S 3/067* (2006.01)

(52) U.S. Cl.
CPC .... *H01S 3/094096* (2013.01); *H01S 3/06704* (2013.01)

(58) Field of Classification Search
CPC .......... H01S 3/094096; H01S 3/06704; H01S 3/107; H01S 3/06754; H01S 3/094053; H01S 3/0604; H01S 3/0632; H01S 3/1608; H01S 3/0809; H01S 3/083; H01S 1/02; H01S 5/1042; H01S 5/1096; G02F 1/39

See application file for complete search history.

(56) References Cited

U.S. PATENT DOCUMENTS

2015/0234211 A1* 8/2015 Goldsmith ............ G02F 1/0147
359/288

OTHER PUBLICATIONS

H.-Z. Weng et al., "Dual-Mode Microcavity Semiconductor Lasers," in IEEE Journal of Selected Topics in Quantum Electronics, vol. 25, No. 6, pp. 1-8, Nov.-Dec. 2019, Art No. 1501408 (Year: 2019).*

(Continued)

*Primary Examiner* — Matthew Mikels

(57) ABSTRACT

A tunable microwave source based on dual-wavelength lasing of a single optical whispering gallery microcavity includes a dual-wavelength laser having the single optical whispering gallery microcavity for generating dual-wavelength lasing with adjustable spacing, narrow linewidth and low threshold; an optical fiber or waveguide amplifier for optical signal amplification; an optical filter for optical signal and noise filtration; and a high-speed detector for generating a tunable microwave signal with narrow bandwidth. The dual-wavelength laser includes a pump source, the optical whispering gallery microcavity, an optical waveguide or a tapered optical fiber, a microcavity substrate, and a gold electrode pair. The frequency spacing of the dual-wavelength lasing is tuned by adjusting the external voltage of the gold electrode pair.

7 Claims, 3 Drawing Sheets

(56) References Cited

OTHER PUBLICATIONS

Wang W, Chu ST, Little BE, Pasquazi A, Wang Y, Wang L, Zhang W, Wang L, Hu X, Wang G, Hu H, Su Y, Li F, Liu Y, Zhao W. Dual-pump Kerr Micro-cavity Optical Frequency Comb with varying FSR spacing. Sci Rep. Jun. 2, 20164 (Year: 2016).*

R. Dubertrand et al., "Circular dielectric cavity and its deformations", in Physical Review A 77, 013804 (2008).

Heng Long et al., "Dual-transverse-mode microsquare lasers with tunable wavelength interval", in Optics Letters, vol. 40, No. 15, pp. 3548-3551, Aug. 1, 2015.

Jintian Lin et al. "Electro-optic tuning of a single-frequency ultranarrow linewidth microdisk laser", in Advanced photonics, vol. 4(3), 036001, May/Jun. 2022.

David Marpaung et al., "Integrated microwave photonics", in Nature Photonics, vol. 13, Feb. 2019, pp. 80-90.

Rongbo Wu et al., "Lithium niobate micro-disk resonators of quality factors above $10^7$ ", in Optics Letters, vol. 43, No. 17, pp. 4116-4119, Sep. 1, 2018.

C. C. Liu et al., "Wave functions with localizations on classical periodic orbits in weakly perturbed quantum billiards", in Physical Review E 74, 046214 (2006).

\* cited by examiner

TUNABLE MICROWAVE SOURCE BASED ON DUAL-WAVELENGTH LASING OF SINGLE OPTICAL WHISPERING GALLERY MICROCAVITY

CROSS REFERENCE OF RELATED APPLICATION

The present invention claims priority under 35 U.S.C. 119(a-d) to CN 202210991189.X, filed Aug. 18, 2022.

BACKGROUND OF THE PRESENT INVENTION

Field of Invention

The present invention relates to the field of optical communication, semiconductor optoelectronics, integrated photonics and microwave photonics, mainly relates to a tunable microwave source based on dual-wavelength lasing of a single optical whispering gallery microcavity, and more specifically, the present invention provides a dual-wavelength laser having the single optical whispering gallery microcavity, which has simple structure, small size and adjustable spacing. Also, the present invention provides a tunable microwave source generation system.

Description of Related Arts

The optical microcavity laser represented by the whispering gallery microcavity laser uses the continuous total internal reflection of light on the smooth side wall to realize the strong binding on the light field. It has the advantages of high quality factor, small mode volume, low pump power and easy integration. However, whispering gallery modes (WGMs) are very dense within optical gain and there is longitudinal mode competition, so it is difficult to achieve single-mode lasing or stable dual-wavelength or even multi-wavelength lasing on the premise of obtaining high gain. In order to obtain low-noise, high-intensity, tunable microwave signals, it is usually necessary to use two independent lasers for the beat frequency of dual-wavelength optical signals. Compared with the two independent lasers, a single optical whispering gallery microcavity is able to generate two stable wavelengths of laser light from dual-modes in the same microcavity, so the microwave signal with good stability and narrow line width is able to be obtained by the beat frequency due to the relatively low phase fluctuations between two lasing-modes in the single microcavity. Dual-wavelength lasing from single microcavity has simple structure and production process, small size, low cost, easy integration and high stability. The frequency spacing of the two wavelengths is determined by the microcavity mode spacing, which covers from several GHz to several hundred GHz, and the microwave signal generated after the beat frequency is wide in range. However, the method, which includes obtaining a stable dual-wavelength laser by the single optical whispering gallery microcavity, and then generating a tunable microwave source by beat frequency, faces a problem that how to achieve a stable dual-wavelength laser with tunable spacing and narrow linewidth.

SUMMARY OF THE PRESENT INVENTION

An object of the present invention is to provide a tunable microwave source based on dual-wavelength lasing of a single optical whispering gallery microcavity, which is able to solve problems of the preparation of the existing on-chip dual-wavelength micro laser. Compared with the independent dual laser system, the dual-wavelength laser provided by the present invention only needs one optical whispering gallery microcavity; based on the characteristics that quasi-degenerate multi-localized periodic orbits generated by perturbation of the microcavity have high Q values and almost identical dual-wavelength gain, it overcomes the defect of the signal instability caused by the mode competition of the conventional multi-longitudinal mode laser. It has the characteristics of simple preparation process, small size, high quality factor, low pump threshold and easy integration. The microwave source generated by beat frequency has the advantages of wide signal range, narrow bandwidth, tunability and stable frequency.

To achieve the above object, the present invention provides technical solutions as follows.

A tunable microwave source based on dual-wavelength lasing of a single optical whispering gallery microcavity comprises:

a dual-wavelength laser having the single optical whispering gallery microcavity for generating dual-wavelength lasing with adjustable spacing, narrow linewidth and low threshold;

an optical fiber or waveguide amplifier for optical signal amplification, wherein an input end of the optical fiber or waveguide amplifier is connected with an output end of the dual-wavelength laser;

an optical filter for optical signal and noise filtration, wherein an input end of the optical filter is connected with an output end of the optical fiber or waveguide amplifier; and a high-speed detector for generating a tunable microwave signal with narrow bandwidth, wherein an input end of the high-speed detector is connected with an output end of the optical filter, wherein:

the dual-wavelength laser comprises:

a pump source;

the single optical whispering gallery microcavity;

an optical waveguide or a tapered optical fiber which is directly connected, laterally or vertically coupled with the single optical whispering gallery microcavity through evanescent waves for inputting pump light, outputting lasing, and simultaneously introducing mode weak perturbation, wherein the mode weak perturbation is also able to be achieved by removing an arched boundary of the microcavity corresponding to at most a central angle of 18-degree through linearly cutting, or depositing an arched medium or semiconductor material on an upper surface of the boundary of the microcavity, so as to recombine WGMs (whispering gallery modes) with approximate geometric characteristics and intrinsic frequency to generate quasi-degenerate polygon modes with similar spatial distribution characteristics along a periphery of the microcavity in pump and laser wavelengths but with a π phase difference to suppress mode competition respectively, one of the quasi-degenerate polygon modes comprises at least two quasi-degenerate multi-localized periodic orbits;

a microcavity substrate; and a gold electrode pair, wherein a positive electrode and a negative electrode of the gold electrode pair are disposed on an upper surface or a periphery of a cavity body of the single optical whispering gallery microcavity;

while pumping a quasi-degenerate multi-localized periodic orbit in a wavelength of the pump source, the single optical whispering gallery microcavity generates a dual-wavelength laser which resonates with two quasi-degenerate multi-localized periodic orbits in the laser wavelength and a π-phase difference;

a spatial overlap of any quasi-degenerate multi-localized periodic orbit in the wavelength of the pump source and the two quasi-degenerate multi-localized periodic orbits with π-phase difference in the laser wavelength is close to 5:5, which is almost exactly overlapping, thereby obtaining the stable dual-wavelength laser and the stable microwave source due to suppression of the mode competition.

The microcavity substrate is made from lithium niobate, silicon, silicon dioxide, silicon nitride, silicon carbide, group IV semiconductor materials and their compounds, group III-V compounds, group II-VI compounds, group IV-VI compounds, organic semiconductor materials or sapphire.

Gain media of the single optical whispering gallery microcavity are rare earth ions or quantum dots; the single optical whispering gallery microcavity is a microdisk, deformed, microring or racetrack-shaped resonator.

All the quasi-degenerate polygon modes at the pump wavelength and lasing wavelength have characteristics as follows. The intrinsic frequency difference between the quasi-degenerate pump and lasing modes is in a range of several GHz to THz magnitude, where a difference between radial quantum number and azimuthal quantum number of the quasi-degenerate multi-localized modes is fixed and is determined by the intrinsic frequency and a corresponding quantum number, so that mode field geometric distribution of each of the quasi-degenerate lasing and pump modes is close to each other, but with a π phase difference. Thereby, a spatial overlap factor between the quasi-degenerate pump mode and the quasi-degenerate lasing mode is high and close to each other, leading to a high suppression of the mode gain competition and in turn the formation of the stable dual-wavelength laser.

The quasi-degenerate polygon modes with similar spatial distribution characteristics are generated by recombination of the WGMs which is caused by mode weak perturbation of the single optical whispering gallery microcavity, the perturbation has little effect on a quality factor of the WGMs, maintaining the inherent high quality factor of at least $10^6$ in the WGMs; the quasi-degenerate polygon modes with similar spatial distribution characteristics are far away from the edge of the microcavity, encounter a small surface scattering loss, and have quality factors of at least $10^6$, thereby obtaining a laser with narrow linewidth.

By changing a diameter of the single optical whispering gallery microcavity, a coupling distance between the optical waveguide or tapered optical fiber and the single optical whispering gallery microcavity, and a wavelength of the pump light, a polygon shape of the quasi-degenerate polygon modes with similar spatial distribution characteristics is selectively excited, so as to obtain a different frequency spacing of dual-wavelength laser, thereby controlling a working range of the dual-wavelength laser.

The quasi-degenerate polygon modes with similar spatial distribution characteristics in the laser wavelength have a small spatial distribution difference, so that a local refractive index is changed by means of electro-optic effect, thermo-optic effect or plasma dispersion physical effect, so as to tune the frequency spacing of dual-wavelength.

In the single optical whispering gallery microcavity, provided by the present invention, the quasi-degenerate polygon modes with similar spatial distribution characteristics in the pump and laser wavelengths are far away from an edge of the microcavity, encounter a small surface scattering loss, and have quality factors of at least $10^6$, thereby obtaining a laser with narrow linewidth; the quasi-degenerate polygon modes in the laser wavelength have small frequency spacing, similar spatial distribution characteristics, is able to obtain a similar high optical gain, and is easy to realize the stable dual-wavelength or even multi-wavelength lasing. Moreover, the quasi-degenerate polygon modes possessing similar spatial distribution characteristics but with a π phase difference in the laser wavelength have a small spatial distribution difference, so that a local refractive index is changed by means of electro-optic effect, thermo-optic effect or plasma dispersion physical effect, so as to tune the frequency spacing of dual-wavelength.

The present invention has some beneficial effects as follows. The optical waveguide or tapered optical fiber is coupled with the single optical whispering gallery microcavity for introducing the mode weak perturbation, so as to recombine the WGMs with approximate geometric characteristics to generate quasi-degenerate polygon modes with similar spatial distribution characteristics in pump and laser wavelengths respectively, thereby obtaining the dual-wavelength lasing; the generated optical signal is amplified and filtered, and then the tunable microwave signal is generated by the high-speed detector, which provides a solution with simpler structure and smaller size for the tunable optical frequency and tunable microwave signal source.

DETAILED DESCRIPTION OF THE PREFERRED EMBODIMENT

The present invention is further explained in details in combination with accompanying drawings and embodiments.

Figure 1:
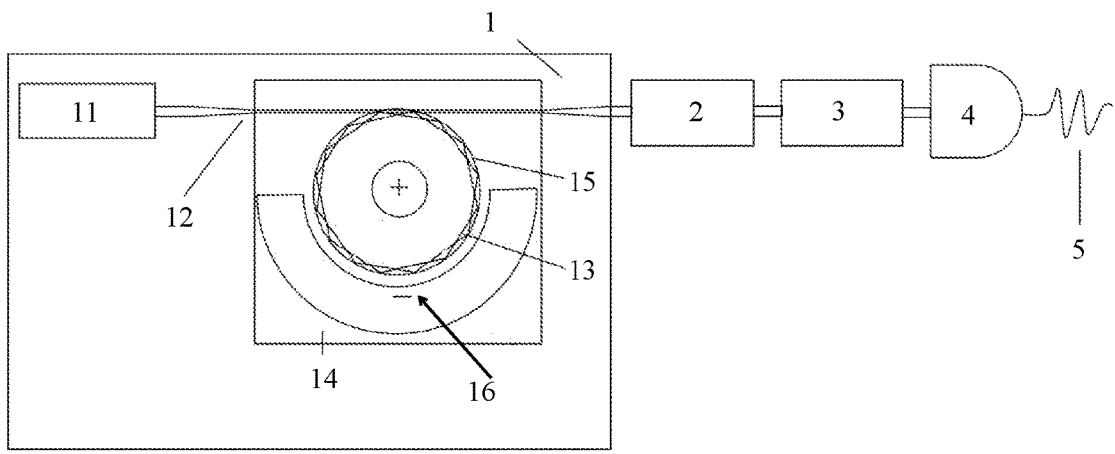
FIG. 1 is a schematic diagram of a tunable microwave source based on dual-wavelength lasing of a single optical whispering gallery microcavity according to a preferred embodiment of the present invention.

Referring to FIG. 1, a tunable microwave source based on dual-wavelength lasing of a single optical whispering gallery microcavity is illustrated. The tunable microwave source comprises a dual-wavelength laser 1 having the single optical whispering gallery microcavity for generating dual-wavelength lasing with adjustable spacing, narrow linewidth and low threshold, an optical fiber or waveguide amplifier 2 for optical signal amplification, an optical filter 3 for optical signal and noise filtration, and a high-speed detector 4 for generating a tunable microwave signal 5 with narrow bandwidth. The output light of the dual-wavelength laser 1 is amplified and filtered by the optical fiber or waveguide amplifier 2 and the optical filter 3 respectively, and then the tunable microwave signal 5 is generated by the high-speed detector 4, and finally the dual-wavelength lasing with adjustable spacing is achieved by adjusting an external voltage of a gold electrode pair 16.

Embodiment

The following are detailed descriptions of each part of a tunable microwave source based on dual-wavelength lasing of a single optical whispering gallery microcavity.

FIG. 1 shows the tunable microwave source based on dual-wavelength lasing of the single optical whispering gallery microcavity. The tunable microwave source comprises a pump source 11 with an optical maser wavelength of 970 nm; a tapered optical fiber 12 with a beam waist of 2 μm; a single optical whispering gallery microcavity 15 which is a microdisk resonator, has a diameter of 106 μm and a thickness of 700 nm and is formed on a Z-cut erbium-doped lithium niobate thin film, wherein a doping concentration of erbium ions is 0.1 mol %; a microcavity substrate 14 which is a lithium niobate crystal, wherein a round silica pillar, with a thickness of 2 μm and a diameter of 60 μm, is provided between the microcavity substrate 14 and the single optical whispering gallery microcavity 15; and a gold electrode pair 16 which comprises a circular positive electrode on the upper surface of the microdisk resonator and a semicircular negative electrode with an opening surrounding the microdisk resonator, wherein a distance between the positive and negative electrodes is 60 μm, the gold electrode pair 16 is for applying an external electric field, so as to tune a frequency spacing of the dual-wavelength.

The single optical whispering gallery microcavity 15 is prepared with a Z-cut erbium-doped lithium niobate thin film by a preparation process of femtosecond laser direct writing assisted chemical-mechanical polishing. The tapered optical fiber 12 is prepared by drawing a standard single-mode optical fiber into a micro-nano optical fiber with a middle beam waist of 2 μm and excessive adiabatic mode field through a hot drawing method, which specifically comprises steps of stripping a layer of polymer of the standard single-mode optical fiber and cleaning, and narrowing a heating area of the cleaned optical fiber by heating the cleaned optical fiber with a hydrogen-oxygen flame and simultaneously stretching two ends of the cleaned fiber with a translation stage, so as to obtain the micro-nano optical fiber with a required beam waist.

Figure 2A:
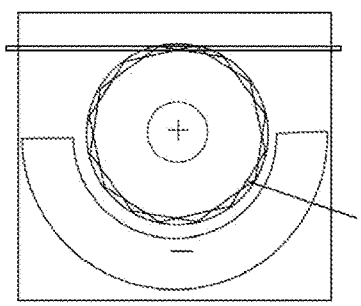
FIG. 2a shows mode field distribution of a quasi-degenerate polygon mode in pump wavelength according to the preferred embodiment of the present invention.
Figure 2B:
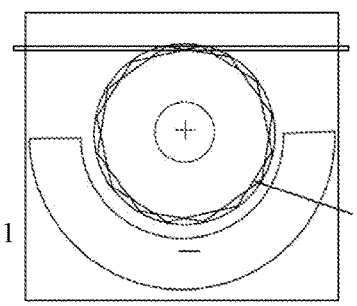
FIGS. 2b and 2c show mode field distribution of two quasi-degenerate polygon modes in laser wavelength, respectively according to the preferred embodiment of the present invention.
Figure 2C:
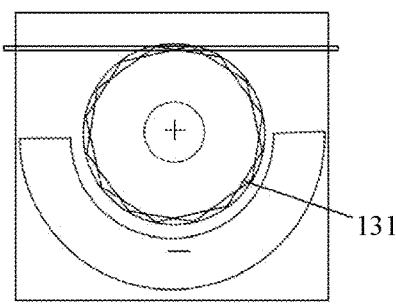

The tapered optical fiber 12 is coupled with the single optical whispering gallery microcavity 15 for introducing mode weak perturbation, so as to recombine WGMs (whispering gallery modes) with approximate geometric characteristics to generate quasi-degenerate polygon modes 13 with similar spatial distribution characteristics in pump and laser wavelengths respectively. One of the quasi-degenerate polygon modes 13 comprises at least two quasi-degenerate multi-localized periodic orbits 131. Preferably, the quasi-degenerate multi-localized periodic orbits 131 are embodied as quasi-degenerate multi-localized octagonal modes in FIGS. 2a-2c. FIG. 2a shows the mode field distribution of quasi-degenerate multi-localized octagonal modes in pump wavelength; FIGS. 2b and 2c show the mode field distribution of two quasi-degenerate multi-localized octagonal modes in laser wavelength, respectively, both of which are almost identical. Under the drive of the pump source 11, when the pump power exceeds the threshold, these two modes form the dual-wavelength laser with an intrinsic wavelength difference of 9.9 pm. By applying an external voltage to the gold electrode pair 16, the uneven refractive index distribution is generated, which affects the wavelength spacing of these two modes with similar but not consistent mode field distribution, so that the dual-wavelength lasing with adjustable spacing is achieved by adjusting the external voltage.

Figure 3A:
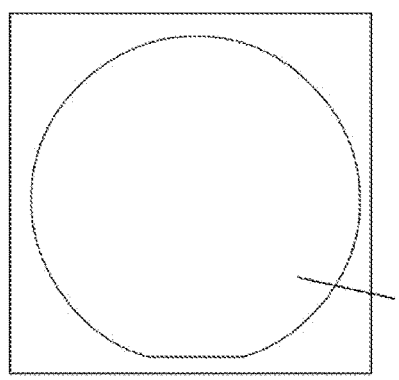
FIG. 3a is a top view of the microcavity which shows that an arched boundary of the microcavity is removed by linearly cutting.
Figure 3B:
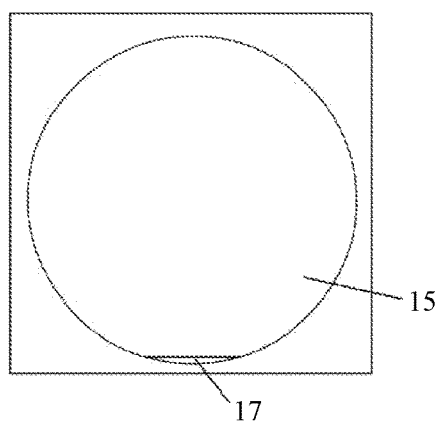
FIG. 3b is a top view of the microcavity which shows that an arched medium or semiconductor material is deposited on an upper surface of a boundary of the microcavity.

The mode weak perturbation is able to be introduced by directly connecting, laterally coupling by evanescent wave, or vertically coupling the optical waveguide or the tapered optical fiber 12 with the single optical whispering gallery microcavity 15. Also, it is able to be achieved by removing the arched boundary of the microcavity through linearly cutting, or depositing an arched medium or semiconductor material 17 on the upper surface of the boundary of the microcavity. FIG. 3a is a top view of the microcavity which shows that the arched boundary of the microcavity is removed by linearly cutting with a focused ion beam, in which a central angle corresponding to the removed arched boundary is at most 18-degree; FIG. 3b is a top view of the microcavity which shows that the arched medium or semiconductor material 17 is deposited on the upper surface of the boundary of the microcavity.

Figure 4:
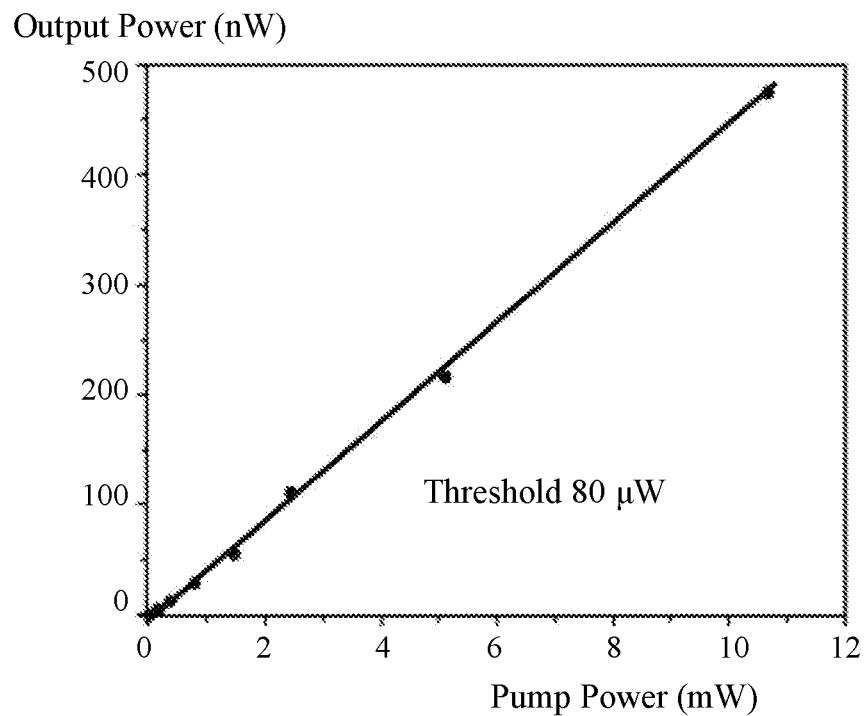
FIG. 4 shows that the output power of a dual-wavelength laser varies with the pump power.

FIG. 4 is a graph which shows the output power of the dual-wavelength laser varies with the pump power according to the preferred embodiment of the present invention, in which the threshold of the pump power is only 80 μW. When the pump power exceeds the threshold, the output power of the dual-wavelength laser increases linearly with the pump power. The graph shows that the device achieves lasing under continuous optical pumping at room temperature.

Figure 5:
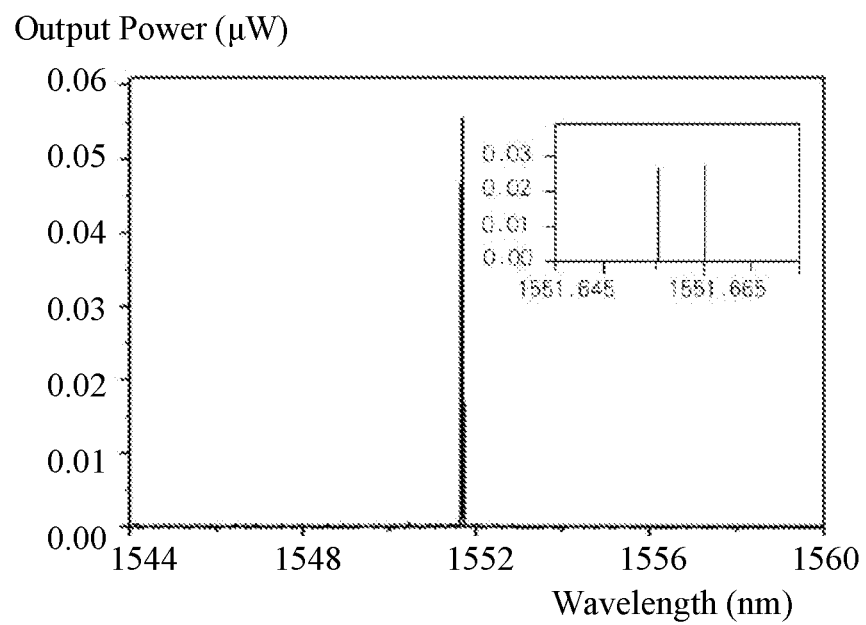
FIG. 5 is a spectral diagram of the dual-wavelength laser according to the preferred embodiment of the present invention, in which the illustration is the fine spectral diagram of the dual-wavelength laser.

FIG. 5 is a spectral diagram of the dual-wavelength laser according to the preferred embodiment of the present invention, in which the illustration is the fine spectral diagram of the dual-wavelength laser, the dual-wavelength spacing is 9.9 pm, and a microwave signal in the order of GHz is produced after beat frequency.

Figure 6:
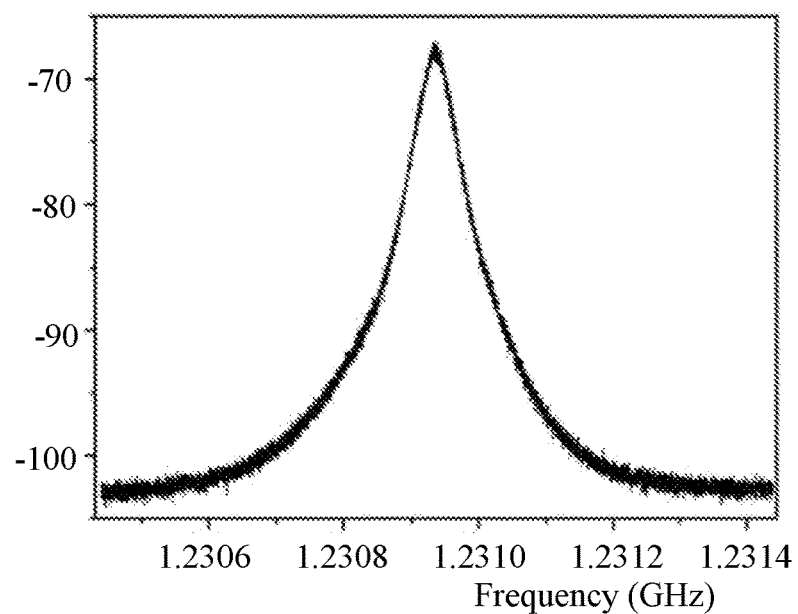
FIG. 6 is a microwave spectrum diagram of an output optical signal of the dual-wavelength laser after an amplifier, a filter, and a high-speed detector according to the preferred embodiment of the present invention.

FIG. 6 is a microwave spectrum diagram of the output optical signal of the dual-wavelength laser after the amplifier, the filter and the high-speed detector according to the preferred embodiment of the present invention, in which the frequency of the microwave signal is near 1.2309 GHz.

Figure 7:
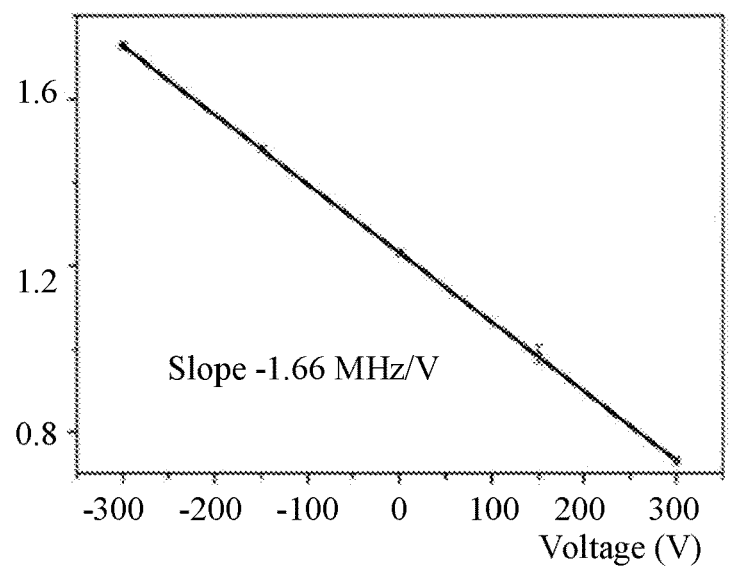
FIG. 7 is a tuning diagram showing the tunable microwave varies with an applied voltage (which uses the electro-optical effect of lithium niobate) according to the preferred embodiment of the present invention.

FIG. 7 is a tuning diagram of the tunable microwave with an applied voltage (which uses the electro-optical effect of lithium niobate) according to the preferred embodiment of the present invention, in which the electro-optical tuning efficiency is measured to be −166 MHz/V when an external voltage varying from minus 300 V to 300V is applied to the gold electrode pair. The result demonstrates the feasibility of the tunable microwave source based on dual-wavelength lasing of the single optical whispering gallery microcavity shown in FIG. 1.

The objects, technical solutions and beneficial effects of the present invention are further described in detail by the above preferred embodiment. It should be understood that the above embodiment is not used to limit the present invention. Any modification, equivalent replacement and improvement made within the spirit and principle of the present invention shall be included in the protection scope of the present invention.

What is claimed is:

1. A tunable microwave source based on dual-wavelength lasing of a single optical whispering gallery microcavity, the tunable microwave source comprising:
    a dual-wavelength laser having the single optical whispering gallery microcavity for generating dual-wavelength lasing with adjustable spacing, narrow linewidth and low threshold;
    an optical fiber or waveguide amplifier for optical signal amplification, wherein an input end of the optical fiber or waveguide amplifier is connected with an output end of the dual-wavelength laser;
    an optical filter for optical signal and noise filtration, wherein an input end of the optical filter is connected with an output end of the optical fiber or waveguide amplifier; and
    a high-speed detector for generating a tunable microwave signal with narrow bandwidth, wherein an input end of the high-speed detector is connected with an output end of the optical filter, wherein:
    the dual-wavelength laser comprises:
    a pump source;
    the single optical whispering gallery microcavity;
    an optical waveguide or a tapered optical fiber which is directly connected, laterally or vertically coupled with the single optical whispering gallery microcavity through evanescent waves for inputting pump light, outputting lasing, and simultaneously introducing mode weak perturbation, wherein the mode weak perturbation is also able to be achieved by removing an arched boundary of the microcavity corresponding to at most a central angle of 18-degree through linearly cutting, or depositing an arched medium or semiconductor material on an upper surface of the boundary of the microcavity, so as to recombine WGMs (whispering gallery modes) with approximate geometric characteristics and intrinsic frequency to generate quasi-degenerate polygon modes with similar spatial distribution characteristics along a periphery of the microcavity in pump and laser wavelengths but with a $\pi$ phase difference to suppress mode competition respectively, one of the quasi-degenerate polygon modes comprises at least two quasi-degenerate multi-localized periodic orbits;
    a microcavity substrate; and
    a gold electrode pair, wherein a positive electrode and a negative electrode of the gold electrode pair are disposed on an upper surface or a periphery of a cavity body of the single optical whispering gallery microcavity;
    while pumping a quasi-degenerate multi-localized periodic orbit in a wavelength of the pump source, the single optical whispering gallery microcavity generates a dual-wavelength laser which resonates with two quasi-degenerate multi-localized periodic orbits in the laser wavelength and a $\pi$-phase difference;
    a spatial overlap of any quasi-degenerate multi-localized periodic orbit in the wavelength of the pump source and the two quasi-degenerate multi-localized periodic orbits with $\pi$-phase difference in the laser wavelength is close to 5:5, which is almost exactly overlapping, thereby obtaining a stable dual-wavelength laser and a stable microwave source due to suppression of the mode competition.

2. The tunable microwave source according to claim 1, wherein the microcavity substrate is made from lithium niobate, silicon, silicon dioxide, silicon nitride, silicon carbide, group IV semiconductor materials and their compounds, group III-V compounds, group II-VI compounds, group IV-VI compounds, organic semiconductor materials or sapphire.

3. The tunable microwave source according to claim 1, wherein gain media of the single optical whispering gallery microcavity are rare earth ions or quantum dots; the single optical whispering gallery microcavity is a microdisk, deformed, microring or racetrack-shaped resonator.

4. The tunable microwave source according to claim 1, wherein all the quasi-degenerate polygon modes at pump wavelength and lasing wavelength have characteristics that an intrinsic frequency difference between quasi-degenerate pump and lasing modes is in a range of several GHz to THz magnitude, where a difference between radial quantum number and azimuthal quantum number of the quasi-degenerate polygon modes is fixed and is determined by the intrinsic frequency and a corresponding quantum number, so that mode field geometric distribution of each of the quasi-degenerate lasing and pump modes is close to each other, but with a $\pi$ phase difference, thereby a spatial overlap factor between the quasi-degenerate pump mode and the quasi-degenerate lasing mode is high and close to each other, leading to a high suppression of mode gain competition and in turn formation of the stable dual-wavelength laser.

5. The tunable microwave source according to claim 1, wherein the quasi-degenerate polygon modes with similar spatial distribution characteristics are generated by recombination of the WGMs which is caused by mode weak perturbation of the single optical whispering gallery microcavity, the perturbation has little effect on a quality factor of the WGMs, maintaining the inherent high quality factor of at least 106 in the WGMs; the quasi-degenerate polygon modes with similar spatial distribution characteristics are far away from an edge of the microcavity, encounter a small surface scattering loss, and have quality factors of at least 106, thereby obtaining the laser with narrow linewidth.

6. The tunable microwave source according to claim 1, wherein by changing a diameter of the single optical whispering gallery microcavity, a coupling distance between the optical waveguide or tapered optical fiber and the single optical whispering gallery microcavity, and a wavelength of the pump light, a polygon shape of the quasi-degenerate polygon modes with similar spatial distribution characteristics is selectively excited, so as to obtain a different frequency spacing of dual-wavelength laser, thereby controlling a working range of the dual-wavelength laser.

7. The tunable microwave source according to claim 1, wherein the quasi-degenerate polygon modes with similar spatial distribution characteristics in the laser wavelength have a small spatial distribution difference, so that a local refractive index is changed by means of electro-optic effect, thermo-optic effect or plasma dispersion physical effect, so as to tune the frequency spacing of dual-wavelength.

* * * * *